United States Patent [19]

Reid et al.

[11] Patent Number: 4,862,393
[45] Date of Patent: Aug. 29, 1989

[54] OIL CHANGE INTERVAL MONITOR

[75] Inventors: David L. Reid, Brighton, Mich.; Robert J. Weimer, Columbus, Ind.

[73] Assignee: Cummins Engine Company, Inc., Columbus, Ind.

[21] Appl. No.: 143,039

[22] Filed: Jan. 12, 1988

[51] Int. Cl.$^4$ .................. G06F 15/20; F01M 11/10
[52] U.S. Cl. ................ 364/550; 364/424.03; 123/196 S; 340/457.4
[58] Field of Search ............ 364/431.03, 424.03, 364/550, 551.01, 552; 340/52 F; 73/117.3, 64; 123/196 S

[56] References Cited

U.S. PATENT DOCUMENTS

| | | | |
|---|---|---|---|
| 4,053,868 | 10/1977 | Cox et al. | 340/52 F |
| 4,159,531 | 5/1979 | McGrath | 364/424 |
| 4,184,146 | 1/1980 | Fratzke et al. | 340/52 F |
| 4,258,421 | 3/1981 | Juhasz et al. | 364/424.04 |
| 4,306,525 | 12/1981 | Faxvog | 123/196 S |
| 4,321,056 | 3/1982 | Dimitroff | 73/116 |
| 4,344,136 | 8/1982 | Panik | 364/424.04 |
| 4,506,337 | 3/1985 | Yasuhara | 73/117.3 |
| 4,533,900 | 8/1985 | Muhlberger et al. | 364/424 |
| 4,630,027 | 12/1986 | Muhlberger et al. | 340/52 F |
| 4,677,847 | 7/1987 | Sawatari et al. | 73/64 |
| 4,694,793 | 9/1987 | Kawakita et al. | 123/196 S |
| 4,706,193 | 11/1987 | Imajo et al. | 364/424 |
| 4,739,482 | 4/1988 | Wrigge | 73/117.3 |
| 4,742,476 | 5/1988 | Schwartz et al. | 73/64 |

Primary Examiner—Parshotam S. Lall
Assistant Examiner—Tuan A. Duong
Attorney, Agent, or Firm—Sixbey, Friedman, Leedom & Ferguson

[57] ABSTRACT

An oil change interval monitor is provided which senses diesel engine variables such as oil temperature, fuel flow and the volume of oil added to the engine since the last oil change and combines these variables with values determined by known engine parameters to provide a continuously updated indication of the percentage of oil life used by the engine since the last oil change.

19 Claims, 2 Drawing Sheets

OIL CHANGE INTERVAL MONITOR

The present invention incorporates a microfiche appendix with one microfiche having 36 frames.

BACKGROUND OF THE INVENTION

1. Field of the Invention

The present invention relates to oil change interval monitors generally, and more particularly to a device which monitors the useful life of engine oil during the normal operation of a diesel engine and provides an indication to the engine operator of the optimal time to change the engine oil. The oil change interval monitor is especially useful with trucks and recreational vehicles, which often incorporate diesel engines having a relatively large oil capacity, but is also useful with diesel engines employed for other applications.

2. Background Art

The use of microprocessors to monitor engine parameters has increased dramatically in recent years due to the development of inexpensive microprocessors coupled with the increase expense of engine fuels and engine structures and components. Sophisticated monitoring systems, such as those shown by U.S. Pat. Nos. 4,053,868 to Cox et al, 4,184,146 to Fratzke et al, 4,258,421 to Juhasc, and 4,344,146 to Panik have been developed to monitor a plurality of engine parameters and to provide an indication or warning of engine conditions. Devices of this type conventionally monitor, among other parameters, oil pressure, oil temperature and oil levels, but normally these monitoring systems measure only existing conditions and perform no predictive functions.

Devices dedicated to providing an accurate measurement of a specific engine parameter have also been developed, as illustrated by the method for measuring engine oil consumption disclosed in U.S. Pat. No. 4,321,056 to Dimitroff. Here, however, consumption is measured by providing additives to the engine lubricant and then analyzing the engine exhaust gas.

Modern diesel engines have relatively large oil capacities, and it is therefore important to accurately monitor the oil consumption of such engines. However, analysis of oil consumption only is not enough and, ideally, a unit dedicated strictly to engine oil monitoring should have a capability to monitor the useful life of engine oil during normal operation of a diesel engine and to indicate to the operator the optimal time to change the oil. A unit having this capability plus the capability of indicating to the operator the oil life which has been used and that which remains would be ideal for effective engine maintenance. However, these indications which involve both actual and predictive functions, are affected by a number of engine variables. It is therefore critical to determine what engine parameters and variables must be measured, and how these measurements must be combined to provide the desired indicating and predictive functions. Oil replacement intervals for a diesel engine can presently be manually calculated using a known formula and chart method for calculating oil change interval, but such calculation involves the use of conditions prevalent at the time of the calculation. If oil is added to the engine or other similar variables occur after a manual calculation, the accuracy of the calculation is adversely affected.

DISCLOSURE OF THE INVENTION

It is a primary object of the present invention to provide a novel and improved oil change interval monitor for use with a diesel engine which operates effectively to estimate the useful life of engine oil during the normal operation of the engine and to indicate what percentage of the oil life has been used at any given time. The device operates instantaneously to indicate the optimal time to change the engine oil, and this time is constantly up-dated in accordance with variable operational parameters.

Another object of the present invention is to provide a novel and improved oil change interval monitor which employs oil temperature and engine fuel flow and/or its derivatives as the primary sensed values for providing an indication of the useful life of engine oil.

A further object of the present invention is to provide a novel and improved oil change interval monitor for a diesel engine which begins a continuous monitoring process of engine parameters whenever the engine is active. The oil change interval monitor automatically stores all current engine status information including the latest interval value for oil life every time the engine is shut off, or after 24 hours of continuous engine operation.

Yet another object of the present invention is to provide an oil change interval monitor for a diesel engine which is operative when the engine is shut down to receive information indicative of oil which is added to the engine. This oil information is input into an oil entry module which is mounted in the vicinity of the engine oil filler tube.

A further object of the present invention is to provide a novel and improved oil change interval monitor for a diesel engine which calculates the optimal change interval for engine oil using the engine rail pressure.

Another object of the present invention is to provide a means to compensate for the long term drift of the zero offset of the rail pressure transducer. Immediately upon starting of the engine, the device takes a zero reading of the rail pressure and maintains this reading as an offset adjust for all subsequent readings to compensate for long term zero drift of the pressure transducer employed.

Yet another object of the present invention is to provide a novel and improved oil change interval monitor for a diesel engine which provides an estimate of oil life based upon engine fuel flow and oil temperature. If the oil temperature increases above a predetermined amount, the unit automatically doubles a fuel flow value obtained through use of the rail pressure in the calculation of the oil replacement interval.

A still further object of the present invention is to provide a novel method for calculating the oil replacement interval for a diesel engine through the use of the engine rail pressure. Fuel flow is expressed as a function of rail pressure and is used in calculating the oil change interval. The fuel flow rate is increased if oil temperature increases above a predetermined value.

These and other objects of the present invention are accomplished by providing an oil change interval monitor which senses diesel engine variables such as oil temperature, fuel rail pressure and the volume of oil added to the engine since the last oil change, and combines these variables with values determined by known engine parameters to provide a percentage of oil life used indication which is constantly updated during periods of engine operation. The oil temperature and the rail pressure are periodically sensed, and during each sensing cycle a plurality of measurements are taken and averaged to obtain an average rail pressure and oil temperature value to be used for subsequent calculations. Normal calculations occur when the oil temperature remains within a predetermined range; i.e., 150 degrees F. to 250 degrees F., but unique calculations for the percentage of oil life used indication are made when the engine oil temperature is either above or below this predetermined range.

BEST MODE FOR CARRYING OUT THE INVENTION

Figure 1:
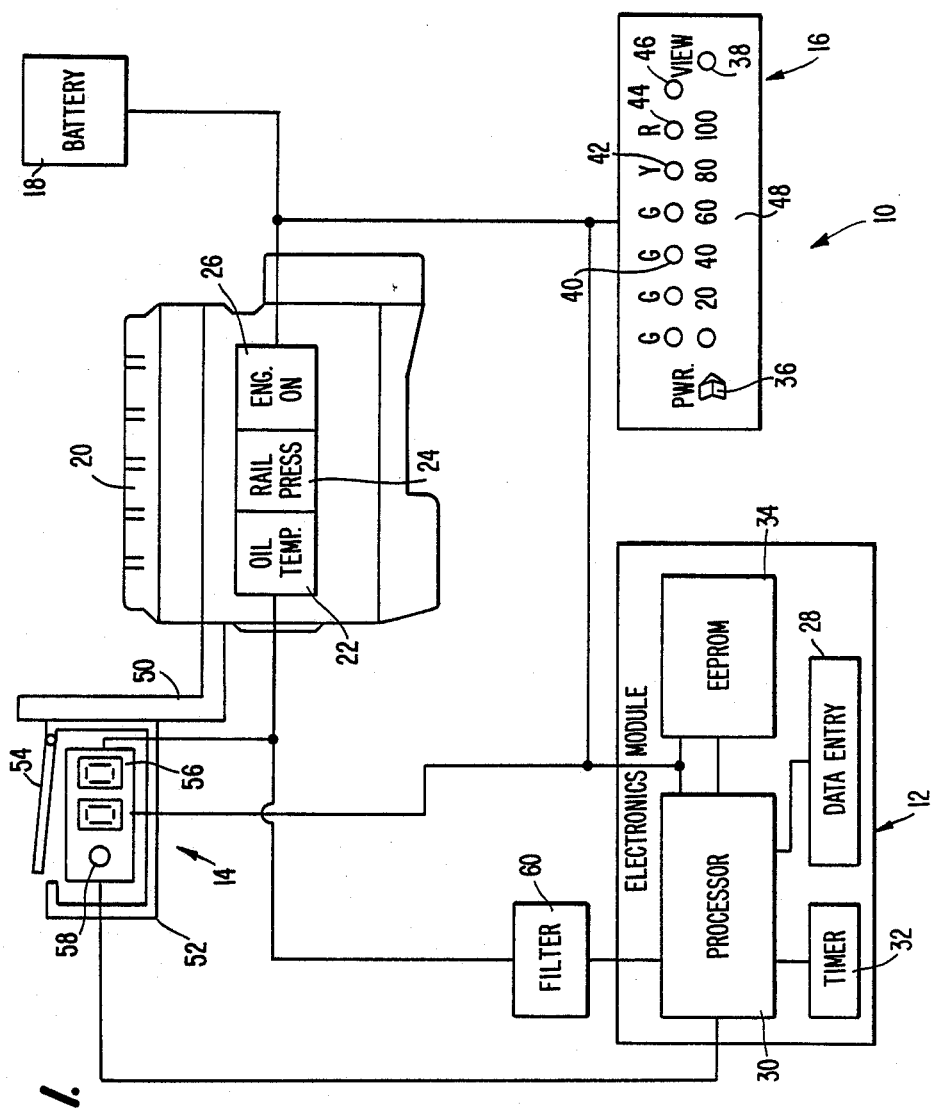
FIG. 1 is a block diagram of the oil change interval monitor of the present invention.

The oil change interval monitor 10 of the present invention is designed primarily for trucking operations, and consequently will be subsequently described in a vehicle environment. However, it should be recognized that the system is also useful for diesel engines used for stand-alone applications as well as for off the road vehicle uses.

The basic oil change interval monitor 10 consists of three interconnected modules; namely, an electronics module 12, an oil entry module 14 and a display module 16. The monitor is powered by a conventional battery 18 for a diesel engine 20, and receives signals from engine monitoring transducers which include an oil temperature transducer 22, a rail pressure monitoring transducer 24, and an engine on monitor 26. The engine oil temperature transducer is positioned in any conventional manner to measure and provide an output indicative of the temperature of the oil in the engine 20, while the rail pressure monitoring transducer provides an output indicative of rail pressure within a common fuel rail for the diesel engine.

The electronics module 12 is, for vehicle use, preferably located in the vehicle cab, and includes the circuit components required to calculate an optimum oil change interval based upon preset and condition sense inputs received by the module. The electronics module includes a data entry component 28 to enable constants that are associated with the type of engine being monitored to be preset into the unit. These constants include an engine constant that is determined by the engine type, a value which corresponds to the oil capacity of the engine in gallons from 0 to 63, and an indication of whether oil is to be added to the engine in gallons or in quarts. The data entry component can also be actuated to indicate whether the engine on circuit is to be configured for a positive or a negative electrical ground.

The data entry component 28 can constitute any variable or hand wired component capable of setting system constants for subsequent use for calculations to be performed by a central processor. In its simplest form, the data entry component can be formed by a set of jumpers on a printed circuit board which are permanently preset in accordance with the parameters for a specific engine.

The heart of the electronics module 12 is a central processor 30, which is an 8 bit microprocessor having a conventional RAM memory, analog to digital converter channels, and a PROM (programmable read-only memory), among other features. This microprocessor can be formed, for example, by a standard version Motorola MC6805R3L processor using Motorola 6805 Assembly language, but other suitable 8 bit processors can also be used.

The microprocessor 30 monitors all system inputs including those from the oil entry module 14, the monitoring transducers 22, 24 and 26, and the data entry component 28 and performs all of the calculations for oil life used. Under the control of a timer 32, the microprocessor begins a continuous monitoring of the engine 20 whenever the engine on monitor 26 indicates that the engine is operating and power is provided to the oil change interval monitor. At periodic timed intervals, i.e., every 36 seconds, the microprocessor acquires an oil temperature indication and a rail pressure signal from the transducers 22 and 24 respectively. With this and other variable and preset data, the microprocessor calculates an updated indication of the oil life used by the engine since the last oil change. The most recent calculation with all other current engine status information is directed by the microprocessor to an EEPROM (electrically erasable programmable read-only memory) 34 for storage when the microprocessor receives an indication that the engine has been shut down, or when the timer provides an indication that the engine has been continuously running for 24 hours. This saves the integrity of the calculation prior to the power down.

The display module 16 is also mounted in the vehicle cab and is connected to receive control information signals from the electronics module 12. The display module includes a view pushbutton button 38, a plurality of green indicator lights 40, a yellow indicator light 42, and a red indicator light 44. These indicator lights may be formed by an LED display, and combine with indicia 48 beneath each light to indicate to an operator the usage of oil life in increments of 0, 20, 40, 60, 80 and 100 percent. The microprocessor 30 determines which of the indicator lights will be illuminated in accordance with the calculation made by the microprocessor for oil life used, and an operator, by depressing the view pushbutton 38, can cause the green, yellow and red indicator lights selected by the microprocessor to illuminate. The microprocessor causes the indicator lights to track the percentage of oil usage in the following manner:

0–20% usage=All green lights on
20–40% usage=Three green lights on
40–60% usage=Two green lights on
60–80% usage=One green light on
80–100% usage=One yellow light on
100% usage=One red light on The indicator lights on the display module 16 can be viewed for ten seconds after the view pushbutton 38 is depressed and for ten seconds after the engine 20 has been started. The display module is operative regardless of whether the engine 20 is running or is deactivated.

Finally, the oil entry module 14 is mounted in the vicinity of an engine oil filler tube 50 for the engine 20. This module includes an oil and water tight housing 52 which is accessed through a spring loaded door 54. Within the housing is mounted a two character display unit 56 which is operated by a pushbutton 58. The two character display unit may be formed by two Hewlett-Packard #5082-7359 hexadecimal displays which are connected to the microprocessor 30. The display will sequence each time the pushbutton 58 is pressed and the engine 20 is not operating to provide oil add, oil change and unit diagnostic functions.

The display unit 56 is operative only when the engine 20 is shut down, and during this period it is operable to provide data to the microprocessor 30. The pushbutton 58 can be operated when oil is added to the engine to cause the display unit to numerically indicate the number of quarts (or gallons) of oil added. For example, the display unit may sequence between 0 and 16 for this purpose, with a 0 indication being automatically displayed the first time the pushbutton 58 is depressed after the engine is shut off. The microprocessor 30 adds a value indicative of the oil added to the total accumulated value indicative of the number of quarts or gallons added since the last oil change and stores this updated accumulated value for use in future calculations.

After the display unit 56 has been sequenced through the numerical value indications (i.e., 0–16), it may be sequenced a first additional time to provide a "CC" indication and a second additional time to provide a "DD" indication. The "CC" indication initiates an oil change function when the oil in the engine 20 has been changed, and this causes the microprocessor 30 to initialize all oil life summations to zero so that a new cycle of oil life calculations can begin. The microprocessor will also verify that the EEPROM 34 is still functioning properly.

When the display unit 56 is sequenced to provide a "DD" indication, the microprocessor is caused to perform a unit diagnostic function. This includes such operations as sequencing all display module indicator lights off and on, sequencing the display unit 56 through all possible indications, displaying a value from each of the transducers 22 and 24, and verifying the operation of the EEPROM 34.

When the engine 2 is shut down, the microprocessor monitors the operation of the pushbutton 58 and the indicator unit 56. If the pushbutton is pressed to provide an add oil value and then is again pressed before the engine is started, the microprocessor will cause the display unit to display the last oil-add value entered, thus allowing the operator to re-verify or correct the value that had been entered. The next time that the microprocessor senses an engine on condition, it will deenergize the display module indicator lights while it sums the newly indicated oil-add value with the accumulated value of the oil added since the last oil change. The microprocessor will also operate to deenergize the indicator unit 56 after a period of five minutes has elapsed from the time of the last entry.

When the power line 36 for the oil change interval monitor is connected to provide power to the unit from the battery 18, the microprocessor 30 immediately performs a number of initiation functions. The microprocessor reads the settings indicative of engine parameters from the data entry unit 28 and stores these values for use in subsequent calculations. It also accesses the EEPROM 34 for the calculations stored before the unit lost power, so that even in the event of accidental power loss, the unit will operate when power is restored on the basis of the values last stored in the EEPROM.

Both the rail pressure transducer 24 and the oil temperature transducer 22 provide analog signal values to the microprocessor 30 which are converted to digital values in the analog to digital converter channels of the microprocessor. The rail pressure signal contains five components of rail pressure signal error; namely, error caused by high frequency variations in the actual rail pressure being sensed, electrical noise, electrical signal drift from the zero level, nonlinearity in the rail pressure transducer, and electrical signal drift in the gain (span) of the transducer. The effect of high frequency variations in the actual rail pressure are rectified by passing the signal from the rail pressure transducer through a capacitive filter in a filter unit 60, which may be a component in the electronics module 12. Similarly, the effects of electrical noise are corrected by using both a capacitive filter in the filter unit to remove high frequency components and by having the microprocessor 30 programmed to perform an averaging method wherein it takes eight readings of the filtered rail pressure signal and averages them to obtain each rail pressure value used for calculations.

Similarly, the effects of electrical signal noise in the oil temperature signal are removed through filtering of the oil temperature signal by a capacitive filter in the filter unit 60 and the averaging of eight readings provided by the microprocessor. Also, when the microprocessor 30 first senses an engine on signal from the engine on monitor 26, the microprocessor will take a zero reading from the rail pressure transducer 36 and store the value of this zero reading as an offset value. This offset value will then be subtracted from all subsequent sensed rail pressure values to adjust for long term zero drift of the rail pressure transducer.

To calculate the oil replacement interval, the microprocessor 30 samples and averages the output signals from the oil temperature transducer 22 and the rail pressure transducer 24 once every 36 seconds, or during another suitable periodic sampling cycle. The data obtained is used for a calculation of the percentage of oil life used by the engine in accordance with the following formula where, for purposes of illustration, 100% of the oil life is used and an oil change required when 255 gallons of fuel have been burned for each gallon of oil available in the engine oil system. The oil available in the system is the oil system capacity plus one-half of the oil added between changes. This is expressed by the following formula:

$$\% \text{ oil available} = \frac{1}{255} \times \frac{\sum_{0}^{t} w_f \, dt}{\text{oil cap.} + 1/8 \text{ oil add}} \times 100$$

Here, "oil cap" refers to the total engine oil capacity in gallons, "oil add" is the total engine oil added in quarts, and the time interval (t) is measured in hours.

The fuel flow ($w_f$) can be expressed as a function of rail pressure by the following equation:

$$w_f = (K + B(\text{Rail Pressure})^M)$$

In the above equation, K is a constant value which is approximately equal to 1.0. This is to assure that some interval value of $w_f$ is measured when the engine is at idle. The symbol B is a conversion multiplier that will vary with different engines. The symbol M is a conversion factor that typically ranges between 0.667 and 0.750. In the present calculation, a value of 0.667 is preferably used. Thus, in the equation for percentage of oil life used, the above values expand into the following equation:

$$\% \text{ oil available} = \frac{\sum_{0}^{t}(1 + B \times (\text{Rail Press})^{.667})dt}{255 \text{ (oil Cap. + 1/8 oil add)}} \times 100$$

Since oil temperature can directly affect oil life, (it is important to modify the oil change interval when the oil temperature sensed by the oil temperature transducer 22 varies beyond specific ranges. In the present system this is accomplished by using a higher fuel flow than actually exists during a period of out of range oil temperatures. If the oil temperatures exceeds 250° F., the observed fuel flow is doubled to reflect the increased stress on the oil. If the oil temperature is less than 150° F., an artificially high fuel flow rate, numerically equal to the engine system oil capacity, in gallons, is used in the oil life calculation. Therefore, if the engine 20 is constantly running cold, the oil wll be changed after 255 hours.

The normal calculation for percent of oil life used can also be superseded by an equation based on time. Thus, the results of the normal calculation are superseded if the value obtained from a calculation based on the following equation is greater:

$$\% \text{ oil available} = \frac{\sum_{0}^{t} dt}{\text{max time}} \times 100$$

In this equation, the maximum time is set at 600 hours.

Figure 2:
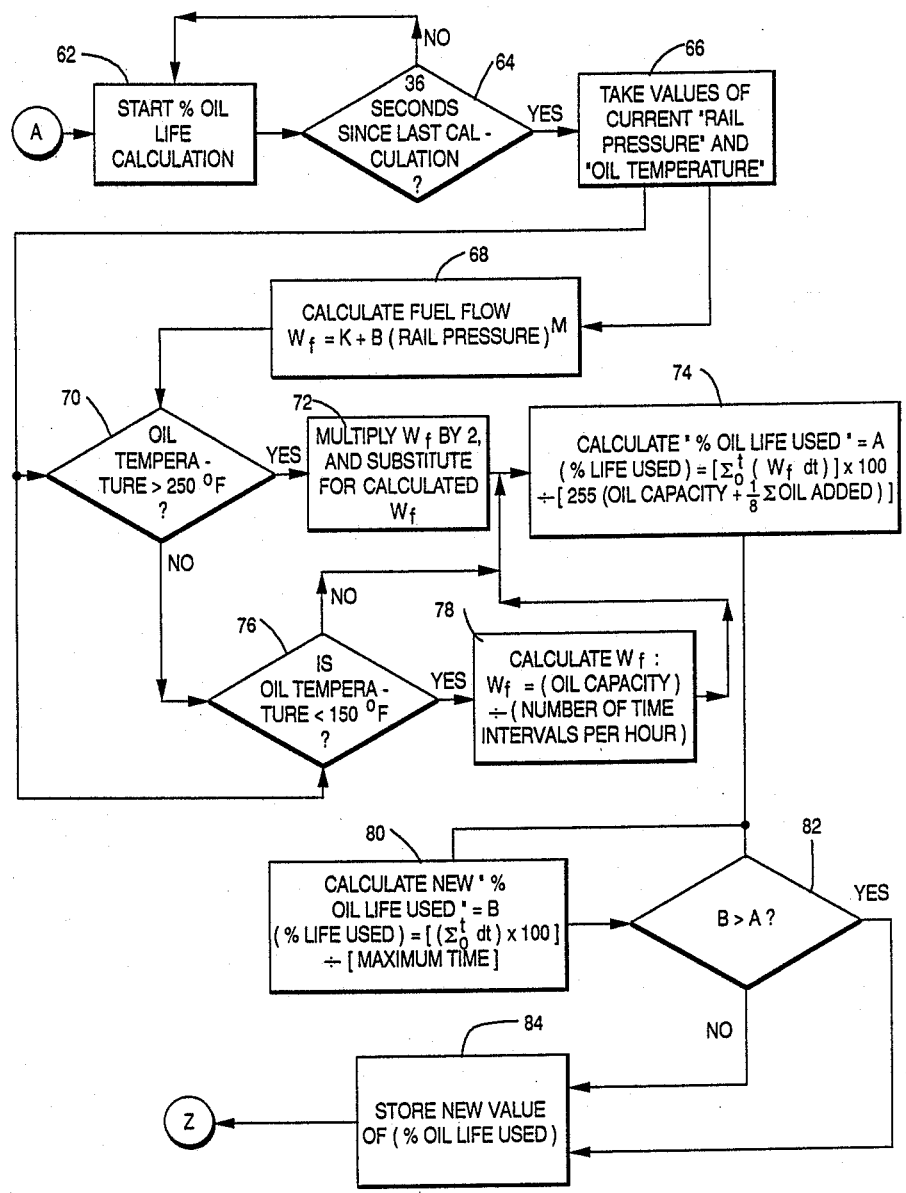
FIG. 2 is a flow diagram illustrating the basic operational sequence for the oil change interval monitor of FIG. 1.

The complete operation of the microprocessor 30 to calculate the percent of oil life used is illustrated by the program of the appendix, but this operation has been condensed for purposes of illustration into the flow chart of FIG. 2. In FIG. 2, the circled symbol "A" indicates the beginning of the routine starting with step 62 which is a label indicating the start of the percentage of oil life remaining calculation. The program proceeds to a decision step 64 for a decision as to whether 36 seconds has elapsed since the last calculation. If the decision is "YES", the routine moves to the next step 66 where the current rail pressure and oil temperature values are obtained. In this step, the rail pressure offset value is used to correct each rail pressure signal value obtained for transducer drift, and eight rail pressure signal values and oil temperature signal values are averaged to provide a single average value for both rail pressure and oil temperature.

The rail pressure value calculated in step 66 is now used in step 68, with some stored engine parameter values, to calculate a fuel flow value ($w_f$). This fuel flow value is then used with the oil temperature value in a decision block 70 to determine if the oil temperature is in excess of 250 degrees F. If "YES", then the calculated fuel flow value is doubled in step 72, and this doubled value is used as the value of $w_f$ in the calculation of the percentage of oil life used which is accomplished in step 74.

If the decision made in decision block 70 is "NO" then the program proceeds to decision block 76 which tests whether the oil temperature is less than 150 degrees F. A "NO" decision at the decision block 76 causes the fuel flow value ($w_f$) calculated in step 68 to be used in the calculation provided at step 74. On the other hand, if the decision at decision block 76 is "YES", new fuel flow value is calculated at step 78. This fuel flow value, which is numerically equal to the engine oil capacity is gallons per hour divided by the number of calculations will then be provided as the $w_f$ value for the calculation of step 74.

A percentage of oil life used value A is calculated in step 74, and a second percentage of oil life using value B is calculated at step 80. The calculation made in step 80 is based upon engine running time, and both the value A and value B are compared at a decision block 82 to determine if value B is greater than value A. If the decision is "YES" then value B is stored in step 84 as the new value of percentage of oil life used, but if the decision is "NO" then value A is stored in step 84. The flow chart then terminates at the circled Z symbol.

INDUSTRIAL APPLICABILITY

The oil change interval monitor 10 is designed to monitor the useful life of engine oil during the normal operation of a diesel engine and to indicate to the operator the percentage of oil life remaining until the optimal time to change the oil is reached. The monitor uses engine variables such as fuel rail pressure, oil temperature and the amounts of oil added since the last oil change in combination with set engine parameters to provide periodically updated values.

We claim:

1. An oil change interval monitor for estimating the percentage of oil life used since the last oil change for a diesel engine having an engine fuel rail comprising:

rail pressure sensing means for sensing the rail pressure of the diesel engine and providing a rail pressure signal;

computing means for receiving said rail pressure signal, for calculating a fuel flow value using the rail pressure signal, and for calculating the percentage of oil life used by the engine using data signals and the fuel flow value;

data entry means for providing data signals to said computing means, the data signals being indicative of engine parameters determined by the engine type; and display means connected to said computing means for displaying the percentage of oil used.

2. The oil change interval monitor of claim 1 further comprising engine on sensing means for sensing when the diesel engine is activated and for providing an engine on signal to said computing means to operate said computing means each time thew engine on signal is received thereby to permit said computing means to receive the rail pressure signal from said rail pressure sensing means which is indicative of a zero reading of said rail pressure sensing means, said computing means storing and subtracting the rail pressure zero reading signal as an offset signal from subsequently received rail pressure signals to adjust for long term zero drift of said rail pressure sensing means.

3. The oil change interval monitor of claim 1 wherein said computing means periodically calculates a new percentage of oil life used and causes said display means to display the most recently calculated percentage of oil life used, said computing means operating to receive a plurality of rail pressure signals from said rail pressure sensing means during each period and averaging the plurality of rail pressure signals to obtain an average rail pressure value, said computing means computing the fuel flow value using the average rail pressure value during each period.

4. The oil change interval monitor of claim 1 further comprising oil temperature sensing means for sensing the oil temperature of the diesel engine and for providing an oil temperature signal to said computing means, said computing means receiving the oil temperature signal and determining if the oil temperature is within a predetermined temperature range, said computing means increasing the calculated fuel flow value before calculating the percentage of oil life used by the diesel engine when the oil temperature is outside the predetermined temperature range.

5. The oil change interval monitor of claim 4 wherein said computing means doubles the calculated fuel flow value when the oil temperature is above the predetermined temperature range.

6. The oil change interval monitor of claim 4 wherein when the oil temperature is below the predetermined temperature range said computing means calculates a fuel flow value which is numerically equal, for a time interval of the calculation, to the value of the engine oil capacity in gallons, wherein the engine oil capacity value is one of the data signals.

7. The oil change interval monitor of claim 1 further comprising oil add entry means for providing an oil add value to said computing means indicative of the oil added to the diesel engine since the last oil change, said computing means using the oil add value in calculating the percentage of oil life used by the diesel engine.

8. The oil change interval monitor of claim 7 further comprising oil temperature sensing means for sensing the oil temperature of the diesel engine and providing an oil temperature signal to said computing means, said computing means determining if the oil temperature is within a predetermined temperature range, the computing means increasing the calculated fuel flow value before calculating the percentage of oil life used by the diesel engine when the oil temperature is outside the predetermined temperature range.

9. An oil change interval monitor for estimating the percentage of oil life used since the last oil change for a diesel engine including a fuel rail, comprising first sensing means mounted on the diesel engine for providing a first signal value indicative of rail pressure within said fuel rail, oil data entry means for providing a second signal value indicative of the amount of oil added to the diesel engine since the last oil change, processor means connected to said first sensing means and to said oil data entry means for receiving and using said first and second signal values to provide an output data signal indicative of the percentage of oil life used by the engine since the last oil change, and display means connected to said processor means for providing a visual indication controlled by the output data signal.

10. The oil change interval monitor of claim 9 further comprising oil temperature sensing means for sensing the oil temperature of the diesel engine and for providing a third signal value indicative of the oil temperature to said processor means, said processor means periodically determining if the sensed oil temperature is within a predetermined temperature range, said processor means adjusting the first signal value before calculating the output data signal when the oil temperature is outside the predetermined temperature range.

11. The oil change interval monitor of claim 10 wherein said processor means doubles the first signal value when the oil temperature is above the predetermined temperature range.

12. The oil change interval monitor of claim 10 further comprising data entry means for providing data signals to said processor means, the data signals being indicative of engine parameters determined by the engine type, said data entry means providing a data signal to said processor means indicative of the value of the engine oil capacity in gallons, and when the oil temperature is below the predetermined temperature range said processor means calculates a fuel flow value which is numerically equal to the value of the engine oil capacity in gallons.

13. The oil change interval monitor of claim 9 wherein said oil data entry means includes indicator means for indicating oil added data and manual entry means for entering oil added data into said indicator means, said manual entry means and said indicator means operating only when the diesel engine is shut down.

14. The oil change interval monitor of claim 10, wherein said first sensing means provides a rail pressure signal to said processor means and said processor means converts the rail pressure signal to a data signal indicative of fuel flow.

15. The oil change interval monitor of claim 14 wherein said processor means operates to receive a plurality of rail pressure signals and a plurality of third signal values indicative of oil temperature during each period and to average the signals to obtain an average rail pressure signal and an average signal indicative of oil temperature.

16. The oil change interval monitor of claim 15 further comprising data entry means for providing data signals to said processing means, the data signals being indicative of known engine parameters determined by the engine type, said processor means calculating the percentage of oil life used by the engine since the last oil change using the fuel flow data signal, the average signal indicative of oil temperature, the second signal indicative of the amount of oil added to the diesel engine since the last oil change, and the data signals indicative of known engine parameters.

17. The oil change interval monitor of claim 16 further comprising engine on sensing means for sensing when the diesel engine is activated and for providing an engine on signal to said processor means to operate said processor means each time the engine on signal is received thereby to permit said processor means to receive a rail pressure signal from said first sensing means which is indicative of a zero rail pressure reading of said first sensing means, said processor means storing and subtracting the rail pressure zero reading signal as an offset signal from subsequently received rail pressure signals to adjust for long term zero drift of said rail pressure sensing means.

18. The oil change interval monitor of claim 17 wherein said oil data entry means includes indicator means for indicating oil added data and manual entry means for entering oil added data into said indicator means, said manual entry means and said indicator means operating only when the diesel engine is shut down and no engine on signal is provided to said processor means.

19. The oil change interval monitor of claim 18 further comprising erasable programmable read-only memory means for operating said processor means upon the deactivation of the engine and for transferring the output data signal indicative of the percentage of oil life used by the engine since the last oil change which was provided during the last period before deactivation of the engine to said erasable programmable read-only memory means.

* * * * *